United States Patent [19]

Young

[11] Patent Number: 4,799,456

[45] Date of Patent: Jan. 24, 1989

[54] COMBINATION MEDICATION APPLICATOR AND PET GROOMING

[75] Inventor: Donald R. Young, 12859 Honeybrook Dr., Hudson, Fla. 33562

[73] Assignees: Donald R. Young; Ruth L. Young, both of Hudson, Fla.

[21] Appl. No.: 178,865

[22] Filed: Apr. 4, 1988

Related U.S. Application Data

[63] Continuation-in-part of Ser. No. 9,672, Feb. 2, 1987, abandoned.

[51] Int. Cl.⁴ ............................................. A01K 13/00
[52] U.S. Cl. ................................... 119/83; 401/190; 132/115
[58] Field of Search .................. 119/83; 132/112, 113, 132/114, 115, 116; 401/190, 188 R, 187; 222/478, 491

[56] References Cited

U.S. PATENT DOCUMENTS

| | | | |
|---|---|---|---|
| 792,124 | 6/1905 | Evans | 132/114 |
| 864,439 | 4/1961 | Horitz et al. | 401/190 |
| 1,686,981 | 10/1928 | Olson | 132/114 |
| 1,823,850 | 9/1931 | Marshall | 132/112 |
| 1,851,859 | 3/1932 | Marshall | 132/112 |
| 1,973,008 | 9/1934 | Metzler | 132/114 |
| 2,270,530 | 1/1942 | Kirschenbaum | 132/112 |
| 2,292,077 | 8/1942 | Holton | 132/114 |
| 2,764,772 | 10/1956 | Staskowski et al. | 401/190 |
| 2,790,190 | 4/1957 | Mastrandrea | 401/188 |
| 2,900,651 | 8/1959 | Powell | 401/190 |
| 3,367,545 | 2/1968 | Cook | 401/190 |
| 3,995,597 | 12/1976 | Warwick | 132/112 |
| 4,055,195 | 10/1977 | Moses | 132/115 |
| 4,090,522 | 5/1978 | Donley et al. | 132/112 |
| 4,552,477 | 11/1985 | Braithwaite et al. | 401/190 |

Primary Examiner—Robert Peshock
Attorney, Agent, or Firm—Stanley M. Miller

[57] ABSTRACT

A combination pet grooming brush and medication dispenser. A hand-holdable base member has a hollow upper chamber for the retention of liquid medication and air and has a solid lower portion having a passageway with plural branches formed therein. The passageway has a first end, confluent with the hollow chamber, that serves as a drain; the passageway splits into plural branches, each of which is confluent with a hypodermic tube. The tubes extend in parallelism with bristle members from a mounting plate releasably secured to the bottom of the base member. A rotationally mounted and axially displaceable spring-loaded valve member opens the passageway to fluid flow when properly rotated and depressed and closes the passageway when released. Air pressure provides the motive force for fluid flow and is supplied by a squeeze bulb confluent with the hollow chamber and separated therefrom by a check valve. A pressure relief valve formed in the hollow chamber ensures against over-pressurization.

20 Claims, 3 Drawing Sheets

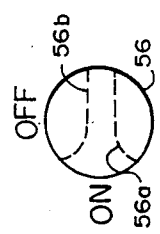
FIG. 4a
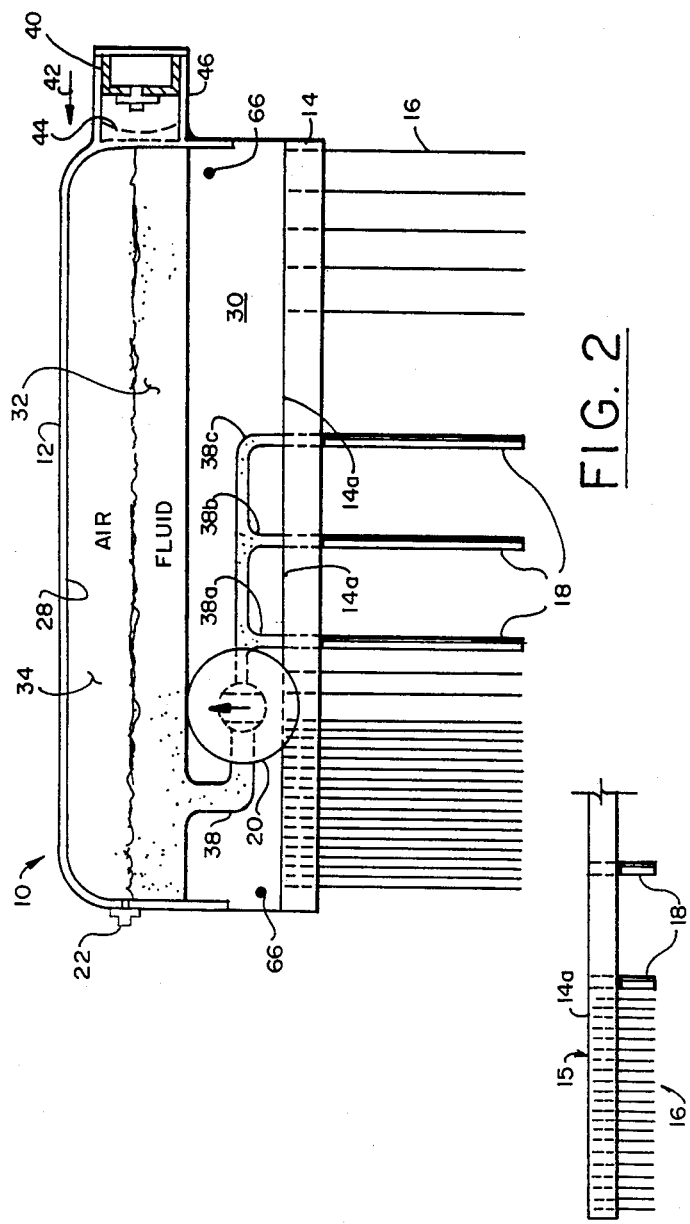
FIG. 2
FIG. 2a

COMBINATION MEDICATION APPLICATOR AND PET GROOMING

This application is a continuation-in-part of application Ser. No. 009,672, filed 2/2/87, now abandoned.

BACKGROUND OF THE INVENTION

1. Field of the Invention

This invention relates, generally, to combination tools, and more particularly relates to a tool that combines a pet grooming brush with an applicator that dispenses medication of the type beneficial to pets.

2. Description of the Prior Art

A 1905 patent to Frost entitled "Fountain Comb," U.S. Pat. No. 798,407, shows a comb, intended for human use, that has plural hollow teeth confluent with a medication-containing reservoir which reservoir is provided in the form of a comb handle. Medication is dispensed to the scalp during the hair combing operation by squeezing a squeeze bulb which forces medication out of the reservoir and through the hollow teeth of the comb.

Another hollow comb having hollow teeth confluent with a liquid-dispensing reservoir is shown in U.S. Pat. No. 1,252,499 to Scheel (1918). It includes a heating element and a hingedly mounted fluffing member; perfume is forced through the hollow teeth of the comb by means of a squeeze bulb.

A hollow, resilient, medication-containing squeezable handle for a comb is shown in U.S. Pat. No. 1,475,786 to Borstelman (1923).

A 1942 U.S. Pat. No. 2,292,077 to Holton, shows a comb with medication-dispensing hollow teeth. A spring-loaded valve member opens and closes an orifice to respectively start and stop fluid flow from a reservoir to the teeth.

A number of other U.S. patents show similar constructions and are identified as follows: 792,124 to Evans (1905); 1,571,933 to Cunningham (1926); 1,686,981 to Olson; 2,270,530 to Kirschenbaum (1942); 2,554,866 to McCain and others (1951); 2,607,355 to Neal and others (1952); 2,790,019 to Mastrandrea (1957); 2,857,919 to Lerner and others (1958); 3,101,086 to Di Vito (1963); 3,147,757 to Hofmann (1964); 3,754,557 to Moore (1973); 4,044,724 to Merchill (1977); 4,055,195 to Moses (1977); and 4,183,328 to Lawrence (1980).

The art, though well-developed, heretofore has not produced a device that dispenses anti-flea medication at the same time it provides a brushing action of the type where the medication is maintained under pressure in a compartment separate from a squeeze bulb.

SUMMARY OF THE INVENTION

A squeeze bulb and a reservoir for anti-flea or other liquid medication are separated from one another by a check valve that allows air to flow from the squeeze bulb to the reservoir but which prevents the flow of medication from the reservoir into the squeeze bulb.

The reservoir is filled about two-thirds full with a medicinal liquid so that a layer of air overlies it; the squeeze bulb is confluent with the air layer so that squeezing the bulb increases the pressure of the air and hence increases the pressure in the fluid in accordance with Pascal's principle.

A pressure relief valve associated with the reservoir ensures that a preselected threshhold pressure will not be exceeded.

The reservoir is formed in a base member that has a hollow upper chamber that serves as said reservoir and a substantially solid lower portion.

A drain means or passageway is formed in said solid lower portion; the passageway has multiple branches. The respective diameters of the branches increase as they become more remote from the main pasageway.

A releasably-mounted bristle mounting plate is affixed to the underside of the base member and a plurality of bristles of the type suitable for pet grooming have their respective proximal ends fixedly secured within said mounting plate.

A plurality of hypodermic tubes are also mounted in said mounting plate and extend therefrom in parallelism with said bristles; the bristles and the tubes have the same length. The tubes are confluent with associated branches of the passageway. A second mounting plate, interchangeable with the first and having shorter bristles and tubes for use with short hair pets, is also provided.

A spring-loaded, rotatably mounted valve member, depressable by a thumb, has an orifice formed in its valve stem; the orifice is rotationally misaligned with the passageway when the valve is turned to its "off" position, and is axially misaligned with the passageway when the valve member is in its equilibrium position which misalignment prevents fluid flow into the tubes.

Pressing the valve member after it has been rotated into its "on" position compresses its associated spring and brings the orifice formed in the valve stem into alignment with the passageway; medicinal liquid, under air pressure supplied by activation of the squeeze bulb, then drains, under pressure, from the reservoir and flows through the multiple branches of the passageway into said tubes and hence onto the skin of the pet.

A sight glass permits visual inspection of the reservoir; additional medication may be added by simpling uncoupling the squeeze bulb from the reservoir.

It is therefore clear that the primary object of this invention is to provide a hand tool suitable for use as a pet groomer and as an applicator of medicinal compounds of the type where the brushing and medicine application can be accomplished simultaneously if desired or at separate times.

A more specific object is to provide a tool having plural hypodermic tubes each of which is in fluid communication with a reservoir containing medicinal fluid under pressure.

Another specific object is to provide a construction whereby a valve means depressable by a thumb admits medicinal fluid into said hypodermic tubes.

Another object is to provide a double-acting valve means of the type that must be both rotated and axially displaced in order to open and close a passageway.

Still another object is to provide a medicine-containing reservoir in the hollow handle of a grooming brush which reservoir is confluent with a source of air but separated therefrom by a one-way valve so that air may flow from the source into the reservoir thereby increasing the pressure on the medicinal compound so that the rate of flow of medicine through dispensing tubes may be adjusted by adjusting the amount of pressure within said reservoir.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a partially cut away side elevational view of the device shown in FIG. 1 but with the squeeze bulb removed therefrom;

FIG. 2A is a side elevational view of an alternative bristle and tube mounting plate;

FIG. 4A is a detailed diagrammatic view of an orifice formed in a valve stem that forms a part of the invention.

Similar reference numerals refer to similar parts throughout the several views of the drawings.

DETAILED DESCRIPTION OF THE PREFERRED EMBODIMENT

Figure 1:
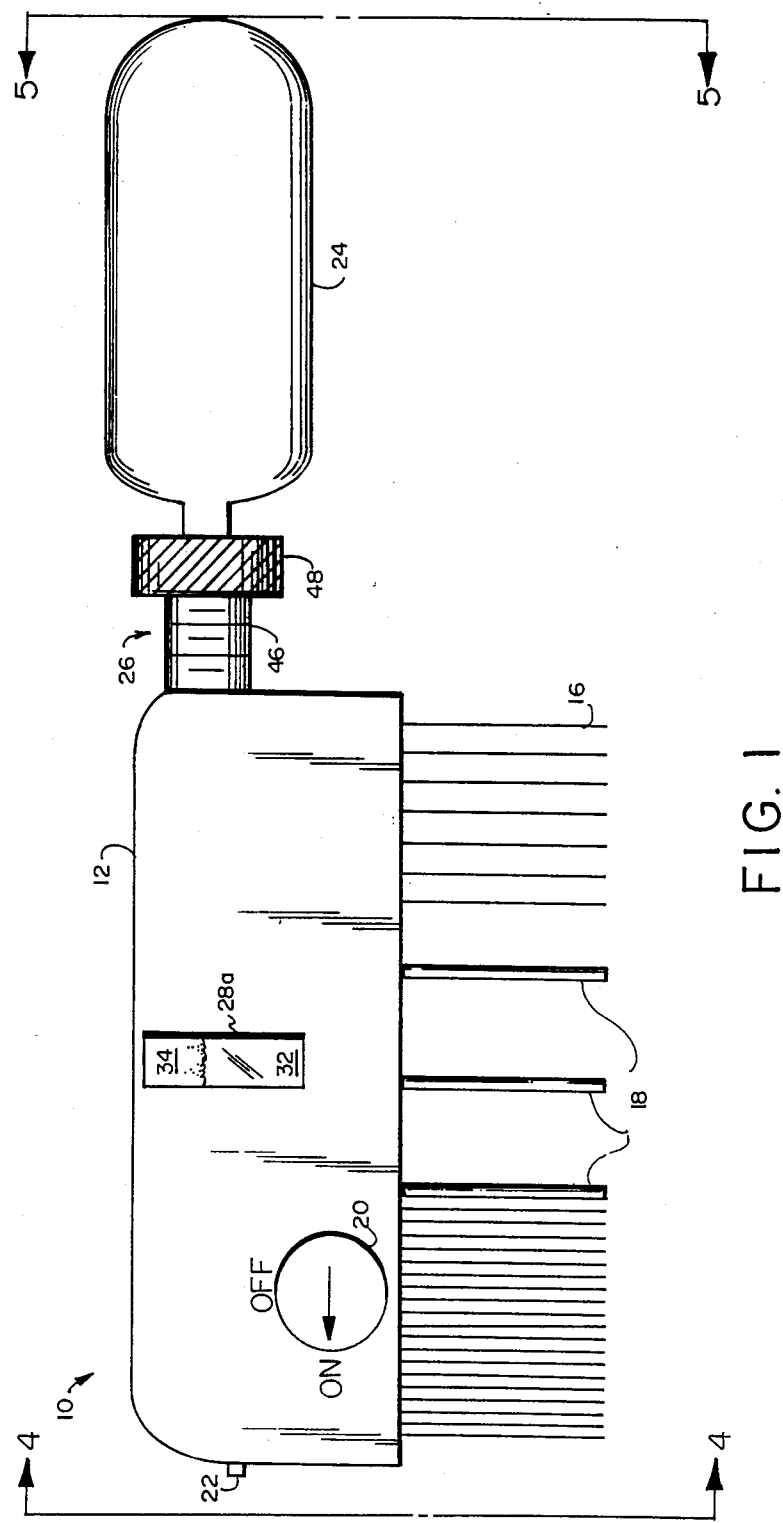
FIG. 1 is a side elevational view of the novel device.

Referring now to FIG. 1, it will there be seen that an illustrative embodiment of the novel device is indicated as a whole by the reference numeral 10.

Tool 10 includes a base member 12, a first bristle and tube mounting plate 14 that is releasably secured to the bottom thereof by suitable snap on means 14a as depicted in FIG. 2, bristles (preferably formed of plain music wire) collectively denoted 16, hypodermic tubes collectively denoted 18, an on-off valve member, having a knurled head, denoted 20 as a whole, a pressure-relief valve 22, a squeeze bulb 24 and a coupling means generally denoted 26 that releasably secures the squeeze bulb 24 to base member 12.

A second bristle and tube mounting plate 15 (FIG. 2A) having shorter bristles and tubes is provided for use with pets having short hair. The above-mentioned snap on means 14a facilitates the interchanging of the long and short bristle mounting plates.

When tool 10 is being used, it is grasped at base member 12 so that the thumb is in position to operate valve member 20 in a manner hereinafter described.

As shown in FIG. 2, base member 12 is seen to have a hollow upper chamber 28 that serves as a reservoir means and a substantially solid lower portion 30.

A medicinal liquid compound such as an anti-flea treatment 32 is contained in the hollow chamber 28; it has been found that the device 10 works best when the liquid 32 initially occupies about two-thirds of the volume of chamber 28. Accordingly, about one-third of chamber 28 is preferably occupied by air 34 as shown.

A transparent sight glass 28a (FIG. 1) permits visual inspection of the liquid level so that it can be replenished as needed.

A drain means or passageway 38 is formed in the solid portion 30 of base member 12 as shown.

Passageway 38 branches into three branches, denoted 38a, 38b and 38c in this embodiment, but it should be understood that any number of branches are contemplated by this invention.

The diameter of passageway 38 is substantially greater than the diameter of the branches 38a, 38b, and 38c, as shown in FIG. 2. As better depicted in FIG. 4A, and as described in connection with FIG. 4A hereinafter, a bell-shaped of flared orifice provides communication between passageway 38 and the smaller branches 38a, 38b and 38c.

As is clearly depicted in FIG. 2, each branch 38a, 38b, 38c is confluent with an associated hypodermic tube 18; accordingly, liquid 32 flowing through said branches will also flow through said tubes and the skin of the pet will be treated as desired.

It is important to note that the diameter of the branches progressively increases as they become more remote from passageway 38. Specifically, the diameter of branch 38b is 0.001 inch greater than the diameter of branch 38a, branch 38c has a diameter 0.001 inch greater than that of branch 38b, and so on. This allows the medicinal liquid to flow to the most remote tubes even when the pressure acting on the liquid is low, because the greater branch diameters present less resistance to the flow of liquid.

The motive force that propels the liquid from upper chamber 28 through passageway 38 is air under pressure; liquid 32 and air 34 cannot escape from upper chamber 28 by any path other than passageway 38 due to check valve 40, shown in the upper right-hand corner of FIG. 2, which valve 40 allows flow of gaseous or liquid fluids only in the direction indicated by the single-headed directional arrow 42. A filter screen 44 bars the entrance of particulates into upper chamber 28.

Both check valve 40 and screen 44 are positioned within an externally threaded neck member 46 which is shown in both FIGS. 1 and 2.

Figure 3:
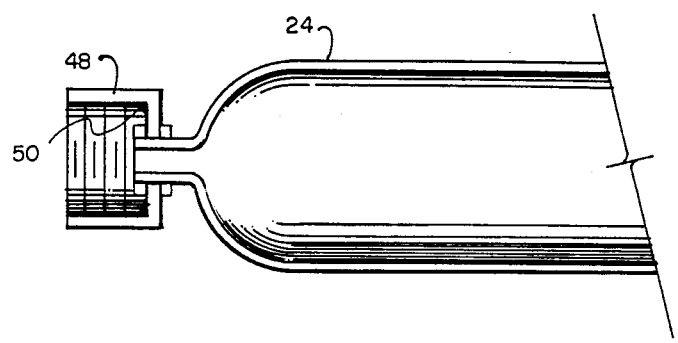
FIG. 3 is a broken away, side elevational detailed view of the squeeze bulb showing the coupling that releasably secures it to the reservoir.

The neck member 46 is screw-threadedly engaged by the internally threaded coupler member 48 depicted in FIG. 3; an "O"-ring member 50 (FIG. 3) prevents unwanted leakage of fluid 32. In this manner, squeeze bulb 24 is releasably coupled to base member 12 and upper chamber 28 can be refilled by simply unscrewing said coupler 48.

Figures 4, 5:
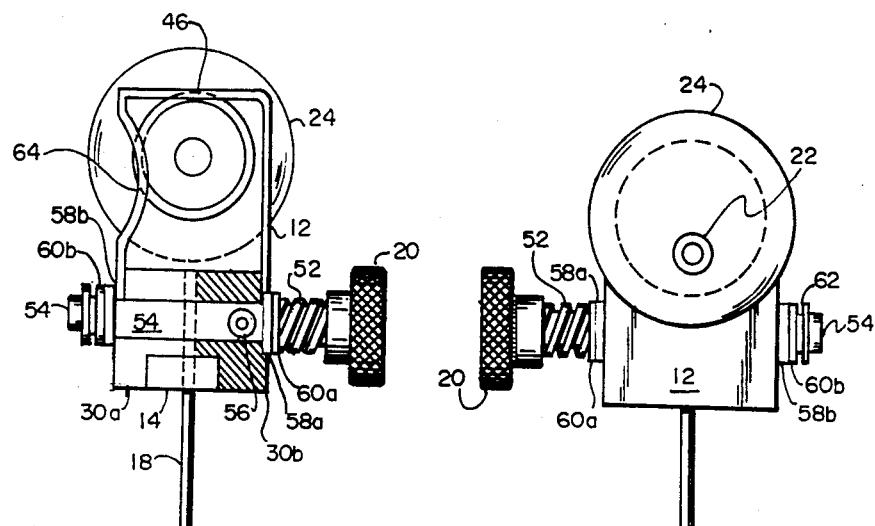
FIG. 4 is an end view of the device taken along line 4—4 of FIG. 1.
FIG. 5 is an end view of the device taken along line 5—5 of FIG. 1.

The mechanism for starting and stopping fluid flow through the passageway 38 includes valve member 20 and its associated parts, all as best seen in connection with FIGS. 4 and 5, to which FIGS. attention is now directed.

Valve member 20 is rotatably mounted and is thus understood to be a stop cock-type of valve member; it is biased outwardly with respect to base member 12 by spring member 52. Valve 20 includes valve stem 54 having an orifice 56 formed therein, which orifice is rotationally misaligned with passageway 38 when valve 20 is in its "off" position as perhaps best understood in connection with FIG. 1, and which orifice is axially misaligned with said passageway when said stem 54 is in its "out" position as depicted. It should be appreciated that FIG. 4 depicts valve 20 in its "on" rotational position.

Orifice 56 is bell-shaped, i.e., it is flared outwardly as at 56a where it meets passageway 38, as shown in FIG. 4A. The non-flared, uniform diameter portion of orifice 56 is denoted 56b. This opens the orifice to fluid flow even if orifice 56 and passageway 38 are slightly misaligned. Fluid flows from left to right in FIG. 4A.

The diameter of passageway 38 is less than the diameter of uniform diameter portion 56b of orifice 56; the diameter of the non-flared portion 56b, in turn, is greater than the diameters of branches 38a, 38b and 38c. Thus, if the diameter of passageway 38 were 0.1 inch, the diameter of 56b might be 0.2 inch and that of the largest branch about 0.05 inch.

Further details of construction will be pointed out in connection with FIG. 5. A pair of "O"-rings, 58a, 58b, prevent fluid leakage around valve stem 54; a pair of steel washers 60a, 60b overlie their associated "O"-rings and protect them from wear. Finally, a clip 62 retains valve 20.

Base member 12 may be provided with a dished portion 64, shown in FIG. 4, to provide a finger grip. The lower portion 30 of base member 12 is provided in two halves 30a, 30b (FIG. 4) which are joined and aligned by locator pins 66 appearing in FIG. 2.

To use the novel tool, one first brushes the pet to remove loose hair and any fleas that brushing may remove.

Valve 20 is rotated to its "off" position so that orifice 56 is rotationally and axially misaligned in relation to passageway 38, and squeeze bulb 24 is squeezed until pressure is felt within chamber 28.

Valve 20 is then rotated to its "on" position and brushing is commenced; when it is desired to apply the medicinal compound 32, valve 20 is pressed, thereby compressing spring 52 and bringing orifice 56 into axial alignment with passageway 38.

In this manner, as long as the pressure in chamber 28 is adequate, repeated pressing of valve 20 will open and close passageway 38 and hence its branches 38a, 38b and 38c as desired.

It is obviously a simple matter to re-close valve 20 if the pressure drops too low so that bulb 24 can be squeezed again as many times as may be needed to restore the air pressure in chamber 28 to the desired level.

Thus, the speed of fluid flow may be regulated by the amount of air pressure within chamber 28.

Accordingly, the art of combination tools in general has been advanced and knowledge of pet grooming tools in particular has been added to.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A combination tool of the type having utility as a brush in connection with pet grooming and having utility as an applicator of topical medication in connection with pet health care, comprising:
 a base member having a hollow upper chamber and a solid lower portion;
 a squeeze bulb means disposed in fluid communication with said hollow upper chamber;
 said upper chamber retaining a predetermined quantity of topical medication in liquid form;
 a passageway having plural, substantially parallel branches formed in said solid lower poriton;
 said branches being longitudinally spaced along the extent of said lower portion;
 a first end of said passageway confluent with said hollow chamber;
 said first end of said passageway providing a drain means that permits said medication to flow from said upper chamber into said branches;
 said drain means having a diameter substantially greater than the respective diameter of said branches;
 a first bristle and tube mounting means detachably secured to a bottom side of said base solid portion;
 a plurality of tube members extending substantially normal relative to said mounting means, there being as many tube members as there are passageway branches;
 each of said branches confluent with an associated tube member;
 a valve means formed in said lower portion for selectively opening and closing said drain means so that a fluid within said hollow chamber flows through said drain means and hence into said tube members when said valve means is open;
 said valve means having a valve stem with an orifice formed therein, said orifice being rotationally and axially alignable with said drain means when said valve means is manipulated;
 a plurality of bristle members mounted in said first mounting means and extending therefrom in substantial parallelism relative to said tube members, said bristle members and said tube members having a first common length;
 said valve means being biased so that when said valve means is in its equilibrium position, said orifice is axially misaligned with said drain means;
 said orifice being bell-shaped so that it substantially aligns with said passageway even when said orifice and valve means are slightly misaligned;
 said drain means having a diameter equal to the largest diameter of said orifice and said branches having a diameter equal to the smallest diameter of said orifice.

2. The tool of claim 1, wherein a first branch of said passageway disposed in close proximity to said drain means has a first diameter and wherein respective diameters of each successive branch disposed in increasingly remote disposition relative to said drain means is greater than the diameter of its preceding branch.

3. The tool of claim 2, further comprising a second bristle and tube mounting means detachably secured to a bottom side of said lower portion, said second mounting means carrying bristles and the tube members of a second common length that are truncated with respect to the bristles and tube members carried by said first mounting means.

4. The tool of claim 3, further comprising a sight glass formed in said upper chamber to facilitate visual inspection of its contents.

5. The tool of claim 4, further comprising an "on-off" indicia printed on said base member in relation to the rotational positions of said valve means that correspond to the rotational positions of said valve stem that align and misalign said orifice relative to said passageway.

6. The tool of claim 5, wherein said valve means is biased so that when said valve means is in its equilibrium position, said orifice is axially misaligned with said passageway.

7. The tool of claim 6, wherein said squeeze bulb has an opening detachably connected to and confluent with said hollow chamber.

8. The tool of claim 7, wherein a one-way valve is positioned between said squeeze bulb and said hollow chamber so that air under pressure may flow unidirectionally only from said bulb to said chamber.

9. The tool of claim 8, further comprising a pressure-relief valve formed in said hollow chamber to release pressure therefrom in the event of overpressurization.

10. The tool of claim 9, wherein said squeeze bulb and said hollow chamber are in axial alignment with one another and wherein a releasable coupling therebetween is accomplished by a threaded neck member extending from said hollow chamber and a complementally threaded coupling member associated with said squeeze bulb.

11. The tool of claim 10, wherein said coupling between said coupling member and said neck member is rendered substantially leak-proof by an "O"-ring member positioned interiorly of said coupling member.

12. The tool of claim 11, wherein leakage around said valve stem is substantially eliminated by "O"-ring members flanking said solid portion of said base member.

13. The tool of claim 12, wherein washer members overlie associated "O"-ring members flanking said solid portion to protect said "O"-ring members against wear.

14. The tool of claim 13, wherein a spring member provides the biasing of said valve means.

15. The tool of claim 14, wherein said valve means is provided with a head member integral to said valve stem so that rotation of said head member imparts simultaneous and corresponding rotation to said valve stem.

16. The tool of claim 15, wherein said head member is knurled to facilitate the gripping of said head member.

17. The tool of claim 16, wherein a first end of said spring member bears against and abuttingly engages an associated washer member, and wherein an opposite end of said spring member bears against and abuttingly engages an inside surface of said knurled head member so that said spring member is compressively positioned therebetween.

18. The tool of claim 17, wherein said base member is dished along its extent to provide a finger grip.

19. The tool of claim 18, wherein the solid lower portion of said base member is formed in half portions exhibiting bilateral symmetry and wherein locator pin members provide registration between the two half portions when said solid lower portion is assembled to form said base member.

20. The tool of claim 19, wherein the respective diameters of said branches increase about 0.001 inch as said branches are spaced at greater distances from said drain means so that medication may flow to the most remote tube members even when the air pressure in said hollow chamber is low.

* * * * *